Oct. 4, 1927. C. Y. KNIGHT Re. 16,757
MECHANISM FOR FACILITATING THE STARTING OF INTERNAL COMBUSTION ENGINES
Original Filed Oct. 17, 1918 3 Sheets-Sheet 1.
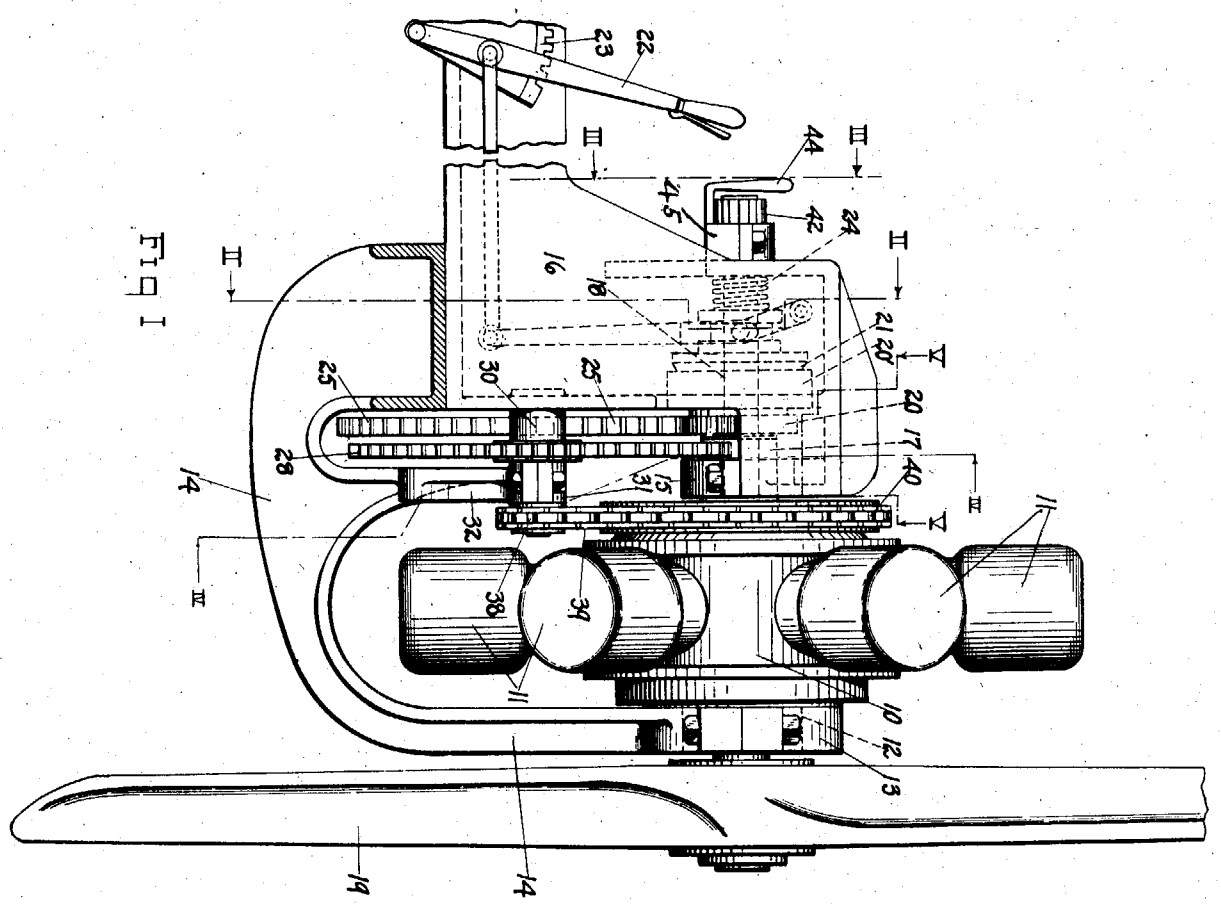
Fig I
INVENTOR.
Charles Y. Knight
BY Haynes H. Gordon
ATTORNEY Oct. 4, 1927. C. Y. KNIGHT Re. 16,757
MECHANISM FOR FACILITATING THE STARTING OF INTERNAL COMBUSTION ENGINES
Original Filed Oct. 17, 1918 3 Sheets-Sheet 2
Fig II
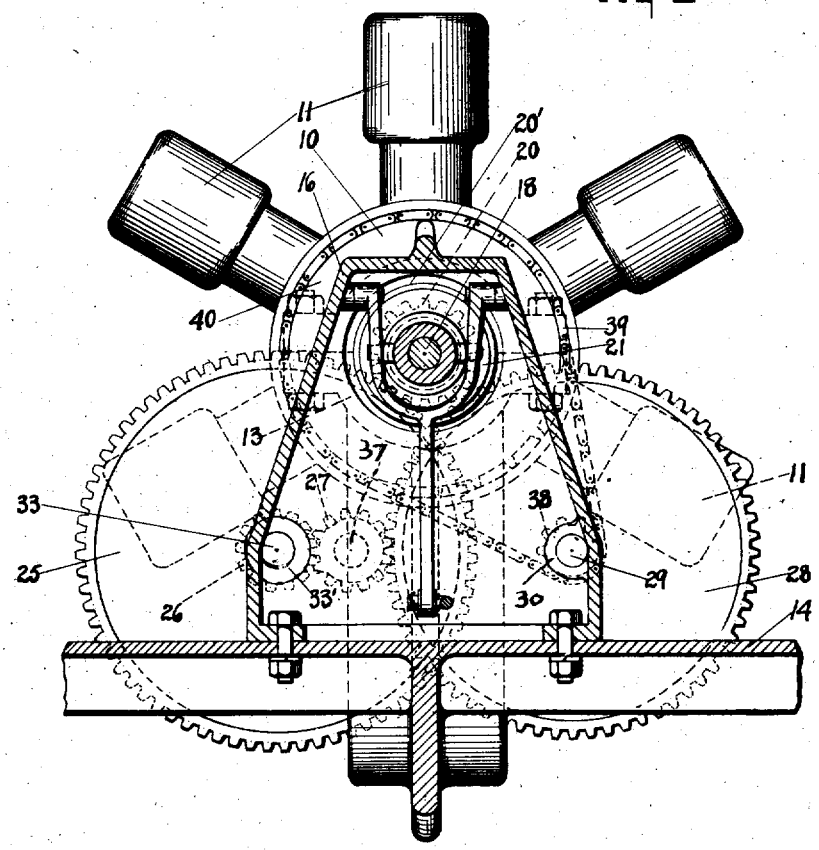
Fig III
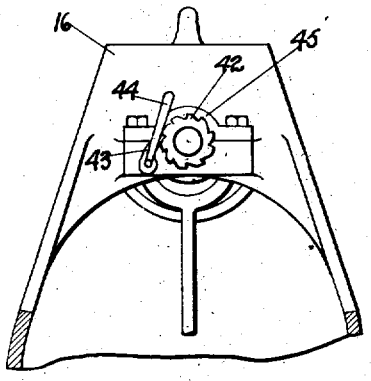
INVENTOR.
Charles Y. Knight
BY Hayden H. Gordon
ATTORNEY Oct. 4, 1927. C. Y. KNIGHT Re. 16,757
MECHANISM FOR FACILITATING THE STARTING OF INTERNAL COMBUSTION ENGINES
Original Filed Oct. 17, 1918 3 Sheets-Sheet 3
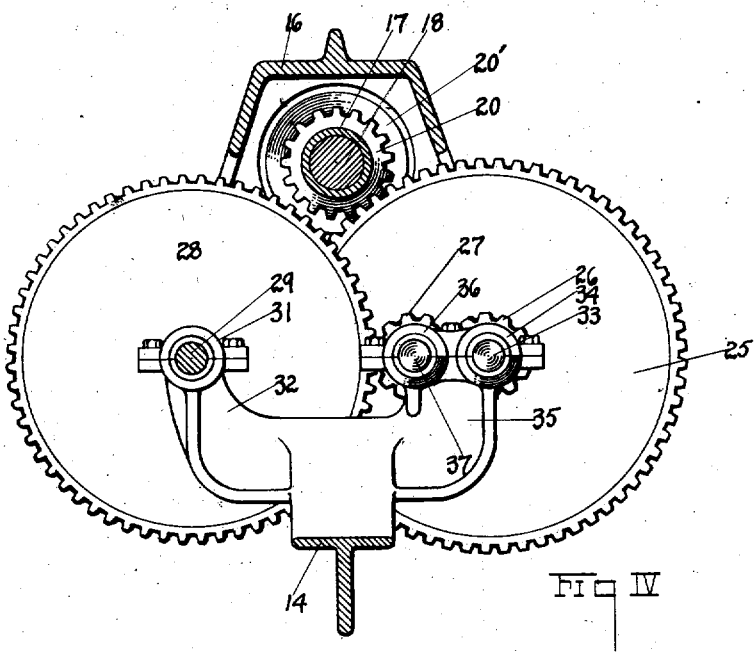
Fig IV
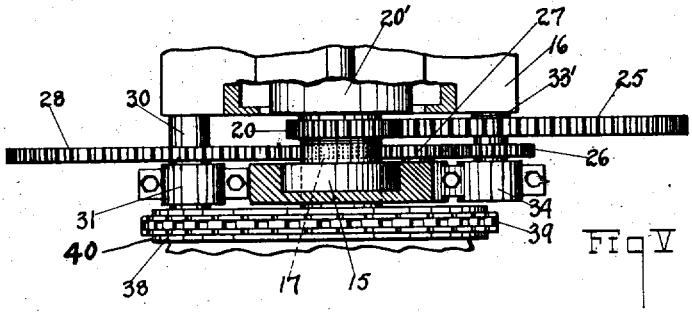
Fig V
INVENTOR.
Charles Y. Knight,
BY Haynes N. Gordon
ATTORNEY.

Reissued Oct. 4, 1927. Re. 16,757

UNITED STATES PATENT OFFICE.

CHARLES Y. KNIGHT, OF PASADENA, CALIFORNIA, ASSIGNOR TO THE KNIGHT AMERICAN PATENTS COMPANY, OF CHICAGO, ILLINOIS, A CORPORATION OF DELAWARE.

MECHANISM FOR FACILITATING THE STARTING OF INTERNAL-COMBUSTION ENGINES.

Original No. 1,305,905, dated June 3, 1919, Serial No. 258,527, filed October 17, 1918. Application for reissue filed December 8, 1919. Serial No. 343,371.

The present invention relates to improvements in mechanism for facilitating the starting of internal combustion engines and has for its object the provision of mechanism of this class which shall be of improved construction and operation.

A further object of the invention is to provide an improved starting mechanism for an engine embodying rotatable portions with means for effecting a change in the speed of one of said portions to insure the starting of the engine.

A further object of the invention is to provide an engine having a driving and a driven portion mounted for rotation in unison with means for effecting a change in speed of one of said portions and means actuated by one of said portions for continuing the rotation of the other portion in the direction in which it is first moved.

Further objects of the invention relate to improvements in detailed forms of construction and in the method of operation which as shown, described and claimed herein constitutes one embodiment of the invention, though it will be understood that other embodiments falling within the scope of the appended claims may be evident to those skilled in the art to which this invention appertains and that therefore the invention is not limited to the specific arrangement shown in the drawings, in which:

Figure I is a side elevation of an engine constructed in accordance with and embodying the objects set forth above.

Figure II is a vertical section taken on line II—II of Figure I.

Figure III is fragmentary vertical section taken on line III—III of Figure I.

Figure IV is a vertical section taken on line IV—IV of Figure I.

Figure V is a fragmentary sectional plan taken on line V—V of Figure I.

In many cases the conditions under which internal combustion engines are operated makes it imperative that the weight of the engine and associated parts shall be reduced to a minimum and under such conditions it is very desirable to dispense with the usual starting mechanism. This is especially true in aerial navigation where the starting of the engine is difficult unless special provision is made for this purpose. In the present application I have shown one form of internal combustion engine in which the engine cylinders and base rotate around the crank shaft and at different rates of speed and I have illustrated my invention as applied to an engine of this type.

In the drawings 10 designates a frame or casing forming the crank casing of an internal combustion engine provided with radially arranged cylinders 11. The frame or casing 10 is provided with a hollow journal 12 supported in a bearing 13 which is carried by a frame member 14 and at the side of the casing 10 opposite the bearing 13 a second bearing 15 is supported by a frame 16 which is suitably connected with the frame 14, said bearing 15 having mounted therein a hollow journal 17 which extends from the casing 10. In this way the casing 10 and the engine cylinders 11 are mounted to rotate freely within the bearings upon the frame members 14 and 16 of the machine. The crank shaft 18 extends through the hollow journals 12 and 17 of the casing 10 and is free to rotate therein. One end of the crank shaft is connected with the load to be driven which in the drawings is illustrated as a propeller blade 19 of an aeroplane. The opposite end of the crank shaft is provided with a gear 20 normally loose upon the shaft and rigidly connected with a clutch disc 20′ arranged to be caused to rotate with the shaft, preferably by means of a friction clutch member 21. The clutch member 21 is controlled by a lever 22 connected with said clutch member by suitable links and which is held in its various positions of adjustment by an adjustable locking member (not shown) which is adapted to engage the teeth of the segment 23 to hold the lever in various positions of adjustment. A spring 24 is provided to force the clutch member 21 into position to lock the disc 20′ and gear 20 upon the shaft 18. The gear 20 meshes with a larger gear 25 which is preferably formed integral with a pinion 26 meshing with an idler pinion 27 which in turn drives a second large gear 28. The gear 28 is rigid upon a shaft 29, one end of which is journaled in a boss 30 on the frame 16 and the other end in a bearing 31 on an arm 32 extending upwardly from the frame 14 as shown in Figures I and IV. The gear 25 and pinion 26 are mounted upon a shaft 33 one end of which is journaled in a boss 33′ on the frame 16 and the other end in a bearing 34 supported by the arm 35 of the frame 14. Mounted upon said arm is also a bearing 36 in which a short shaft 37 carrying the pinion 27 is journaled, said pinion being adapted to drive the gear 28 and pinion 38 on the shaft 29. A sprocket chain 39 connects the sprocket 40 on the engine casing 10 with the pinion 38 on the shaft 29, as shown in Figures I and V.

When the engine is under normal operation the crank shaft 18 and casing 10 will of course be rotated in different directions and the chain of gearing between the engine casing and crank shaft determines the relative speed of rotation of the two engine parts upon the frame. It will be seen that the casing 10 will be rotated through the reduction gearing at a comparatively low rate of speed while the shaft 18 and the propeller blade 19 will be driven at a rapid rate of speed in an opposite direction. By this arrangement the advantages of a rotating engine base and cylinders are secured without the disadvantages resulting from the rapid speed of rotation incident to the type of engine in which the cylinder base rotates at the rate of speed of the driven parts. As shown in Figures I and III the end of the crank shaft 18 has rigidly secured thereto a ratchet wheel 42 and a pawl 43 is pivoted on the frame 16 and provided with a hand lever 44 by which it may be moved into and out of engagement with the ratchet wheel. At this point the crank shaft 18 is journaled in a bearing 45 on the rear of the frame 16, as shown in Figure III.

In starting an engine of this type the clutch member 21 is disconnected and the pawl 43 is moved out of engagement with the ratchet 42. This leaves the engine casing 10 and crank shaft 18 free to be rotated in unison and consequently the entire mass may be rotated as a free wheel without the shifting of the pistons in their cylinders and consequently without the resistance due to compression in the cylinders. On first starting the engine, as by turning the propeller by hand, the parts will be rotated in a counter-clockwise direction as viewed in Figures II and III that is of course when the pawl 43 has been removed to release position. When the momentum of the moving parts has become sufficiently great the operator will move the pawl 43 into engagement with the ratchet 42 and thus stop the rotation of the crank shaft 18, leaving the casing 10 free to continue its rotation in a counter-clockwise direction. Since the cylinders and casing continue to rotate and the shaft 18 is held by the pawl or clutch, as the case may be, it follows that movement of the pistons in their cylinders will take place exactly the same as if the engine base were held stationary and the engine cranked in the usual manner. As soon as the rotation of the crank shaft is sufficiently checked or stopped by means provided for that purpose explosions in the cylinders will begin and the propeller and crank shaft will then rotate in a reverse direction from the cylinders and engine casing. The clutch member 21 may now be thrown in so that the engine base and crank shaft may be made to rotate at a predetermined rate of speed, one with respect to the other, according to the proportion of the gearing connecting them, and when this has been accomplished the engine will be operating in a normal way. When the explosions begin in the engine cylinders the tendency will be to rotate the crank shaft 18 in a clockwise direction as viewed in Figure II and the heavy parts, including the engine casing and cylinders in a counter-clockwise direction. There will be no great strain brought upon the engine since the heavy parts will continue to move in the direction in which they were first moved. Furthermore there will be no great resistance to the movement of the crank shaft in the opposite direction in which the casing is rotated because it rotates freely under the pawl 43 in this direction.

It will be apparent that instead of bringing the crank shaft 18 to a sudden stop by throwing the pawl 43 into engagement with the ratchet 42, the engine may be started as previously stated by first bringing the heavy parts 10 and 11 and the crank shaft 18 up to the necessary speed to give them the required momentum and then throwing the clutch member 21 into engagement with the disc 20′ of the gear 20 which will produce relative rotation of the crank shaft and engine cylinders and cause explosions to occur in the cylinders in the same way as if the engine were cranked in the usual manner.

While I have shown and described in considerable detail a structure constituting one embodiment of the invention it will be understood that such showing and description is more or less illustrative of a particular embodiment of the invention and I do not limit the invention to the exact structure and arrangement of parts shown. It will be further understood that the invention as set forth in the claims comprehends both the broader and more limited manner of carrying out the improvements which I have made and that the claims herein are drawn with the idea in view of protecting all novelty inherent in said invention.

Having thus described my invention, what I claim as new and desire to secure by Letters Patent is:

1. In combination, a motor having the frame member thereof mounted for rotation and having a crank shaft arranged to rotate relative to said frame during the operation of said motor, means for supporting said frame and shaft to rotate in unison with one another, and means for stopping the rotation of said shaft to cause relative rotation of said frame and shaft for the purpose of starting the operation of said motor.

2. In an internal combustion engine, an engine base having engine cylinders mounted thereon, means for supporting said base and cylinders so that they are free to rotate, a shaft connected with said cylinders to be driven thereby, means for supporting said shaft so that it is free to rotate with said engine base and cylinders, and means for checking the rotation of said shaft to cause relative movement between said base and shaft for the purpose of starting the operation of said motor.

3. An internal combustion engine having a rotary crank shaft, cylinders arranged to rotate about said crank shaft, means for supporting said shaft and cylinders so that they are free to rotate in unison with one another, means for interrupting the movement of the shaft thereby causing it to rotate relatively with respect to said cylinders for the purpose of starting the operation of said engine and means for causing said shaft to be driven from said cylinders.

4. In an internal combustion engine, a driving mechanism and a driven member, the mass of the driving mechanism being relatively greater than that of the driven member and said driven member being arranged to be driven in a direction opposite that of said driving mechanism, means for supporting said driving mechanism and driven member to move in unison with one another to develop kinetic energy in said moving parts, and means for causing said parts to move relative to one another under the influence of the energy thus developed for the purpose of starting the operation of said engine, the direction of rotation of said driving member being unchanged by said starting operations.

5. In an internal combustion engine, a base member having cylinders connected therewith, a crank shaft journaled to rotate in said base member and driven by said engine, bearings for supporting said base member and shaft so that they are free to rotate in unison with one another to develop energy of rotation, and means for checking the rotation of said shaft while said engine base continues to move thus producing relative rotation between said shaft and engine base for the purpose of starting the operation of said engine.

6. In combination, an engine comprising a driving portion and a driven portion adapted for relative rotation during the normal operation of the engine, a starting mechanism therefor including means for permitting rotation of both of said portions in unison and subsequently preventing rotation of said driven portion to cause the engine to assume its normal cyclic function.

7. In combination, an internal combustion engine comprising cylinders and a crank shaft adapted for relative rotation with respect to each other during the normal operation of the engine, and starting mechanism therefor including means for permitting rotation of both the cylinders and crank shaft in unison, and means for subsequently retarding the rotation of the crank shaft to effect the starting of the engine.

8. In combination, a driving mechanism comprising an internal combustion engine mounted for rotation and having a driven crank shaft mounted to rotate in unison therewith and in a reverse direction with respect thereto, means for effecting a relative rotation of said shaft to effect a starting of the engine, and means actuated by said shaft for continuing the rotation of the engine in the direction in which it is first moved.

9. In combination, an engine, comprising a driving portion and a driven portion, force transmitting connecting mechanism positioned in fixed relation to said driving portion, said driving portion being arranged to rotate in a non-driving relation with said driven portion, and means for effecting a change in speed of said driven portion without changing the direction of rotation of the driving portion and connecting mechanism to permit the starting of said engine.

10. In combination, a driving mechanism comprising an internal combustion engine mounted for rotation and having a crank shaft mounted to rotate both in unison therewith and relatively thereto in the same or reverse direction, and means for retarding the rotation of said shaft to effect the starting of the engine before reversing the direction of rotation of said shaft.

11. In combination, an engine comprising two portions capable of rotation in unison and in opposite directions in a driven relation, means for varying the speed of one of said portions without change in the direction of rotation to effect the starting of the engine, and means for connecting said portions whereby one will continue to rotate the other.

12. The method of starting an internal combustion engine having two rotatable portions the relative rotation of which causes reciprocation of the pistons in the engine cylinders, comprising rotating said portions in unison to store energy in the rotating mass, then changing the speed of one of said portions whereby relative rotation of the portions, to start the engine, is caused by the energy stored in the other portion and thereafter connecting said portions to maintain a definite relative rotation therebetween.

13. The method of starting an internal combustion engine in which a driving and a driven portion are adapted to rotate relative to each other during the normal operation of the engine, which consists in rotating both the driving and driven portions in unison to store energy in the rotating mass, and subsequently retarding the rotation of one of the portions to permit the stored energy to be utilized in causing relative rotation of the portions to cause the engine to assume its cyclic function.

14. In an internal combustion engine the combination of crank shaft, cylinders arranged to rotate about said crank shaft, speed transmission mechanism connected to said cylinders and means for connecting and disconnecting said crank shaft from said speed transmitting mechanism.

In testimony whereof I affix my signature.

CHARLES Y. KNIGHT.